(12) United States Patent
Lions

(10) Patent No.: US 9,275,122 B2
(45) Date of Patent: Mar. 1, 2016

(54) BUSINESS INTELLIGENCE DASHBOARD GENERATOR

(75) Inventor: Philippe Lions, Venelles (FR)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 549 days.

(21) Appl. No.: 12/552,583

(22) Filed: Sep. 2, 2009

(65) Prior Publication Data

US 2011/0029579 A1    Feb. 3, 2011

Related U.S. Application Data

(60) Provisional application No. 61/229,055, filed on Jul. 28, 2009.

(51) Int. Cl.
*G06F 17/30* (2006.01)

(52) U.S. Cl.
CPC .................. *G06F 17/30569* (2013.01)

(58) Field of Classification Search
CPC ................................. G06F 17/30569
USPC .................. 707/613, 809; 709/213
See application file for complete search history.

(56) References Cited

U.S. PATENT DOCUMENTS

| | | | |
|---|---|---|---|
| 6,026,408 A * | 2/2000 | Srinivasan et al. | |
| 7,503,010 B2 * | 3/2009 | Chaudhri et al. | 715/764 |
| 7,899,781 B1 * | 3/2011 | Pittman et al. | 707/610 |
| 7,899,783 B1 * | 3/2011 | Xu et al. | 707/613 |
| 2002/0091681 A1 * | 7/2002 | Cras et al. | 707/3 |
| 2006/0112123 A1 * | 5/2006 | Clark et al. | 707/101 |
| 2008/0163164 A1 * | 7/2008 | Chowdhary et al. | 717/106 |
| 2008/0209078 A1 * | 8/2008 | Bates et al. | 710/10 |

OTHER PUBLICATIONS

Stuerzlinger et al., "User Interface Facades: Towards Fully Adaptable User Interfaces", UIST'06, Oct. 15-18, 2006, Montreux, Switzerland.*

Chowdhary et al., "Model-Driven Dashboards for Business Performance Reporting", Enterprise Distributed Object Computing Conference (EDOC'06), 2006 IEEE.*

Eubanks et al., "System Dynamics Model Builder and Simulator", WO 01/001206 A3, PCT/USOOII7793.*

(Continued)

*Primary Examiner* — Mariela Reyes
*Assistant Examiner* — Mohsen Almani
(74) *Attorney, Agent, or Firm* — Miles & Stockbridge, P.C.

(57) ABSTRACT

A cloner is configured to assist users in deploying templates from a source environment into a target environment. The cloner includes a source identification module configured to identify source objects in a source environment from one or more business intelligence reports. The cloner also includes a mapping module configured to provide a declarative mapping screen showing the source objects and a list of available objects in a target environment to map the source objects against, and to receive mapping information selections from a user. The cloner further includes a duplication module configured to duplicate the one or more business intelligence reports into the target environment based on the mapping information selections.

24 Claims, 12 Drawing Sheets

(56) References Cited

OTHER PUBLICATIONS

"Oracle Business Intelligence Suite Enterprise Edition Plus—Technical Overview", An Oracle White Paper, Nov. 2007, pp. 1-47; http://www.oracle.com/appserver/business-intelligence/docs/OracleBIEE-wp.pdf.

"Oracle Business Intelligence Suite Enterprise Edition Plus", Oracle Data Sheet, Copyright 2007, 2008, Oracle Corporation and/or its affiliates, pp. 1-7; http://www.oracle.com/appserver/business-intelligence/docs/oracle-bi-enterprise-edition-plus-datasheet.pdf.

\* cited by examiner

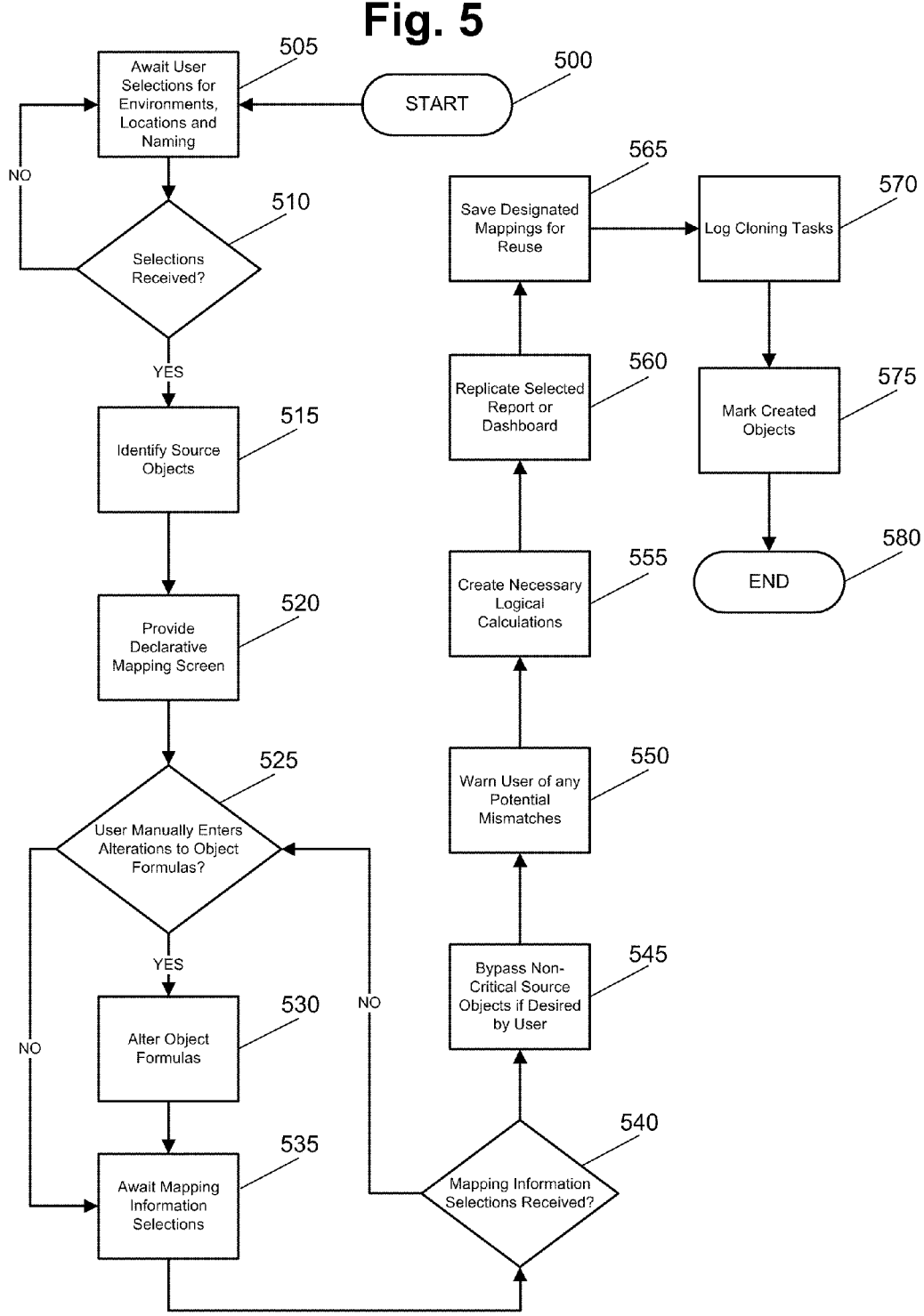

BUSINESS INTELLIGENCE DASHBOARD GENERATOR

PRIORITY

This application claims the benefit of Provisional Application No. 61/229,055 under 35 U.S.C. §119(e), which was filed on Jul. 28, 2009. The contents of the provisional application are hereby incorporated by reference in their entirety.

FIELD

One embodiment is directed generally to computer systems, and in particular to accelerating preparation of content in computer systems.

BACKGROUND

Generally, in business intelligence systems such as Oracle Business Intelligence Suite Enterprise Edition® ("OBI EE"), interactive dashboards and reports may be used to help facilitate enterprise-wide business intelligence. Interactive dashboards may provide individuals with information that is filtered and personalized for their identity, function, or role based on predefined security rules. In the case that a developer wishes to use an existing dashboard or report as a template for another implementation in a target environment, a developer must generally choose between one of two options. The developer may either 1) perform a full manual rebuild of the dashboard or report in the target environment; or 2) extract an Extensible Markup Language ("XML") definition of the dashboard or report and manually update the fields in XML to have proper names in the new target environment.

SUMMARY

In an embodiment, a cloner is configured to assist users in deploying templates from a source environment into a target environment. The cloner includes a source identification module configured to identify source objects in a source environment from one or more business intelligence reports. The cloner also includes a mapping module configured to provide a declarative mapping screen showing the source objects and a list of available objects in a target environment to map the source objects against, and to receive mapping information selections from a user. The cloner further includes a duplication module configured to duplicate the one or more business intelligence reports into the target environment based on the mapping information selections.

BRIEF DESCRIPTION OF THE DRAWINGS

In order that the embodiments of the invention will be readily understood, a more particular description of the invention briefly described above will be rendered by reference to specific embodiments that are illustrated in the appended drawings. While it should be understood that these drawings illustrate only typical embodiments of the invention and are not therefore to be considered to be limiting of its scope, the invention will be described and explained with additional specificity and detail through the use of the accompanying drawings, in which:

FIG. 5 is a flow diagram illustrating a process flow for cloning content according to an embodiment of the present invention.

DETAILED DESCRIPTION

Figure 1:
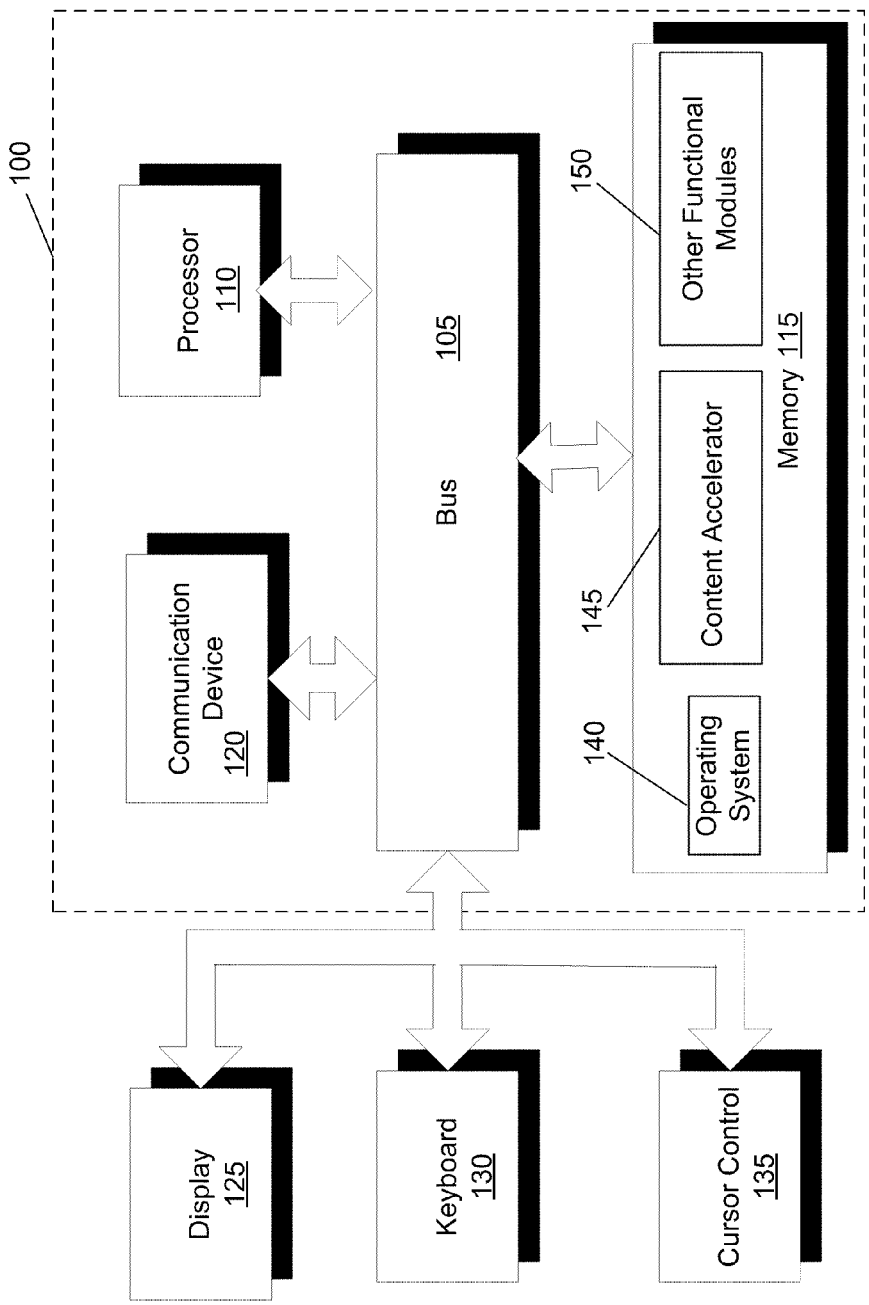
FIG. 1 is a block diagram illustrating a server having a content accelerator that can implement an embodiment of the present invention.

One embodiment is a content accelerator framework ("CAF") that includes a CAF cloner and a CAF synchronizer. The CAF cloner duplicates reports and associated logical calculation objects from a source business intelligence environment in a distinct target business intelligence environment. The CAF synchronizer enables reports using presentation objects to be updated with changes to, for example, presentation object names and locations when changes occur.

As noted above, a developer may wish to use an existing dashboard or report as a template for another implementation in a target environment. For instance, a report showing 80/20 classification of revenue by products could be used as a template for showing 80/20 classification of employees by salary in a different business intelligence environment. In the case of OBI EE, this may include dashboard and report definitions in OBI EE answers (e.g., content from dashboard page columns, content of dashboard page sections, report formulas and calculations, presentation variables, report filters and report views, and relative layout/interaction objects), and logical calculations objects in RPD. In such a case, the developer must generally either 1) perform a full manual rebuild of the dashboard or report in the target environment; or 2) extract an Extensible Markup Language ("XML") definition of the dashboard or report and manually update the fields in XML to have proper names in the new target environment. Both solutions are tedious, risky (due to the complexity of the task) and not scalable (meaning the solutions must be performed on a report-by-report basis). Extensive knowledge of dashboard and report features is generally required to reverse-engineer the source dashboard or report.

A developer may also wish to use existing logical calculations as templates for reuse in a different business intelligence environment. For example, a logical object that calculates compound growth of a balance over time could be used as a template for an object that calculates compound growth of revenue over time in the different business intelligence environment. However, using existing logical calculations from a repository (such as an OBI EE RPD repository file) as templates for reuse in another business intelligence implementation may also be problematic. The logical calculations may include a logical metric definition in the repository, the properties thereof (such as leveling information) and logical ancestor objects that are used as arguments. Generally, in order to "reuse" such logical calculations, a developer reverse-engineers the logical metric and manually rebuilds the calculations into the target environment using the proper objects. This solution is also tedious, risky (due to the complexity of the task) and not scalable (meaning that such reuse must be performed on a metric-by-metric basis). Extensive knowledge of repository features is generally required to reverse-engineer the source objects.

When objects are changed in the repository (such as changing the name of the object, the name of the folder in which the object is located, moving an object from one folder to another, and the like), reports using the changed objects may break in a reports catalog or work with repository aliases that do not provide proper lineage information. In other words, reports using modified objects are not seamlessly updated with proper new names/locations of objects. The issues above can occur either individually or in any combination thereof.

Returning to a high level description of some embodiments of the present invention, a content accelerator framework ("CAF") including a cloner and a synchronizer is configured to help business intelligence applications, such as OBI EE, assist users in deploying templates from a source business intelligence environment into a target business intelligence environment. In OBI EE, the templates may include reports and logical constructs (such as logical RPD constructs), which may be used by dashboards and answers functionality.

Such a CAF may facilitate easy duplication of existing reports and logical constructs from one business intelligence application environment to another. The source and target environments may be completely different and in some embodiments, the only prerequisite is that the target environment already have a basic logical model designed within its logical constructs (such as a repository).

In some embodiments, the CAF cloning and synchronization is performed by a CAF cloner module and a CAF synchronizer module, respectively. The CAF cloner module may leverage existing reports from one business intelligence system implementation as templates for reuse by another business intelligence system implementation. The CAF cloner module may also use existing logical calculations from one business intelligence system implementation as templates for reuse in another, different business intelligence system implementation.

In some embodiments, the CAF cloner module provides an intuitive graphical user interface ("GUI") to clone/duplicate existing business intelligence system calculations and reports into a target business intelligence system. The CAF cloner module allows a user to select a dashboard, report or set of reports from a source web catalog and may offer a "wizard" in the GUI to replicate the selected content (such as dashboard objects and properties, report calculations, layouts and other properties, and calculations used in selected report objects) into the target business intelligence system. In the case that a dashboard is selected, the full layout of the dashboard page will be cloned/duplicated, along with reports contained within the dashboard page.

The CAF synchronizer module may enable reports using presentation objects to be updated with changes to presentation object names and locations when such changes occur. In some embodiments, the CAF synchronizer module identifies changes made in one repository, such as an RPD repository file that is leveraged by OBI EE, that impact a set of reports in a web catalog. The CAF synchronizer module updates the web catalog reports with proper changes in order to include the changes to the repository.

FIG. 1 is a block diagram of a server 100 that can implement an embodiment of the present invention. Server 100 includes a bus 105 or other communication mechanism for communicating information, and a processor 110 coupled to bus 105 for processing information. Processor 110 may be any type of general or specific purpose processor, including a central processing unit ("CPU") or application specific integrated circuit ("ASIC"). Server 100 further includes a memory 115 for storing information and instructions to be executed by processor 110. Memory 115 can be comprised of any combination of random access memory ("RAM"), read only memory ("ROM"), flash memory, cache, static storage such as a magnetic or optical disk, or any other types of computer readable media or combination thereof. Additionally, server 100 includes a communication device 120, such as a network interface card, to provide access to a network. Therefore, a user may interface with server 100 directly, or remotely through a network or any other method.

Computer readable media may be any available media that can be accessed by processor 110 and includes both volatile and nonvolatile media, removable and non-removable media, and communication media. Communication media may include computer readable instructions, data structures, program modules or other data in a modulated data signal such as a carrier wave or other transport mechanism and includes any information delivery media.

Processor 110 is further coupled via bus 105 to a display 125, such as a Liquid Crystal Display ("LCD"), for displaying information to a user, such as server status information. A keyboard 130 and a cursor control device 135, such as a computer mouse, is further coupled to bus 105 to enable a user to interface with server 100.

In one embodiment, memory 115 stores software modules that provide functionality when executed by processor 110. The modules include an operating system 140 that provides operating system functionality for server 100. The modules further include a content accelerator 145 that is configured to facilitate cloning and synchronization of reports. Server 100 can be part of a larger system such as a cluster computing system, a distributed computing system, a cloud computing system, a "server farm" or any other system having multiple servers and/or computing devices. Server 100 will typically include one or more additional functional modules 150 to include additional functionality. In some embodiments, content accelerator 145 may be part of operating system 140 or part of one or more other functional modules included in other functional modules 150. In some embodiments, functional modules 150 include a business intelligence system. In some of these embodiments, the business intelligence system may be Oracle's OBI EE. Data used by the business intelligence system may be provided at least in part by an Enterprise Resource Planning ("ERP") system.

It should be noted that many of the functional features described in this specification have been presented as modules in order to more particularly emphasize their implementation independence. For example, a module may be implemented as a hardware circuit comprising custom very large scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be at least partially implemented in software for execution by various types of processors. An identified unit of executable code in a software module may, for instance, comprise one or more physical or logical blocks of computer instructions which may, for instance, be organized as an object, procedure or function. Nevertheless, the executables of an identified module need not be physically located together, but may comprise disparate instructions stored in different locations that, when joined logically together, comprise the module and achieve the stated purpose for the module. Modules may be stored on a computer-readable medium, which may be, for instance, a hard disk drive, a flash device, random access memory ("RAM"), a tape drive, an optical drive, a compact disk having read-only memory ("CD-ROM") or a digital video disk having read-only memory ("DVD-ROM"), or any other such medium used to store data. The medium may be read-only or read/write.

Indeed, a unit of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Figure 2:
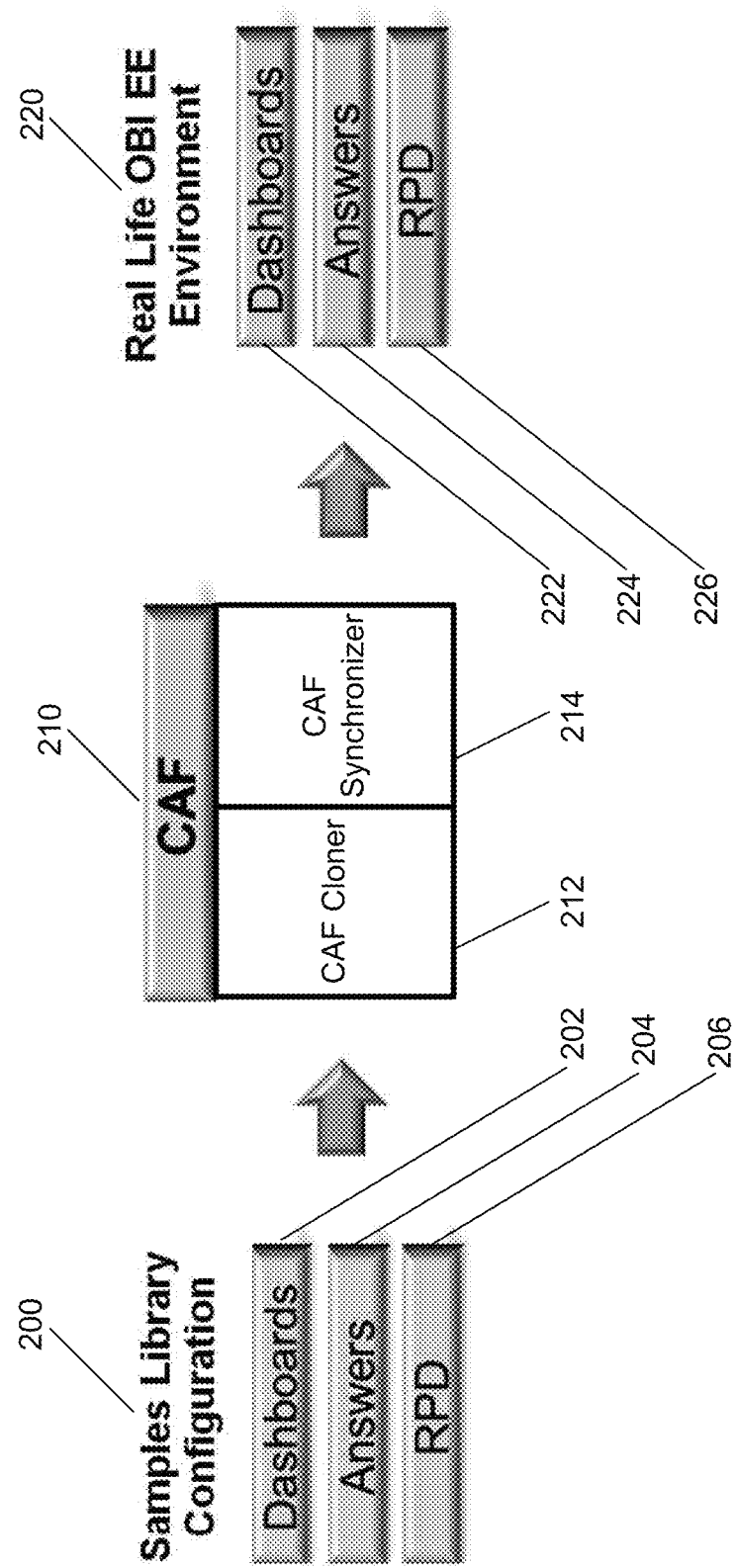
FIG. 2 is a high level architectural diagram illustrating the operation of the content accelerator framework ("CAF") implemented in OBI EE according to an embodiment of the present invention.
Figure 3:
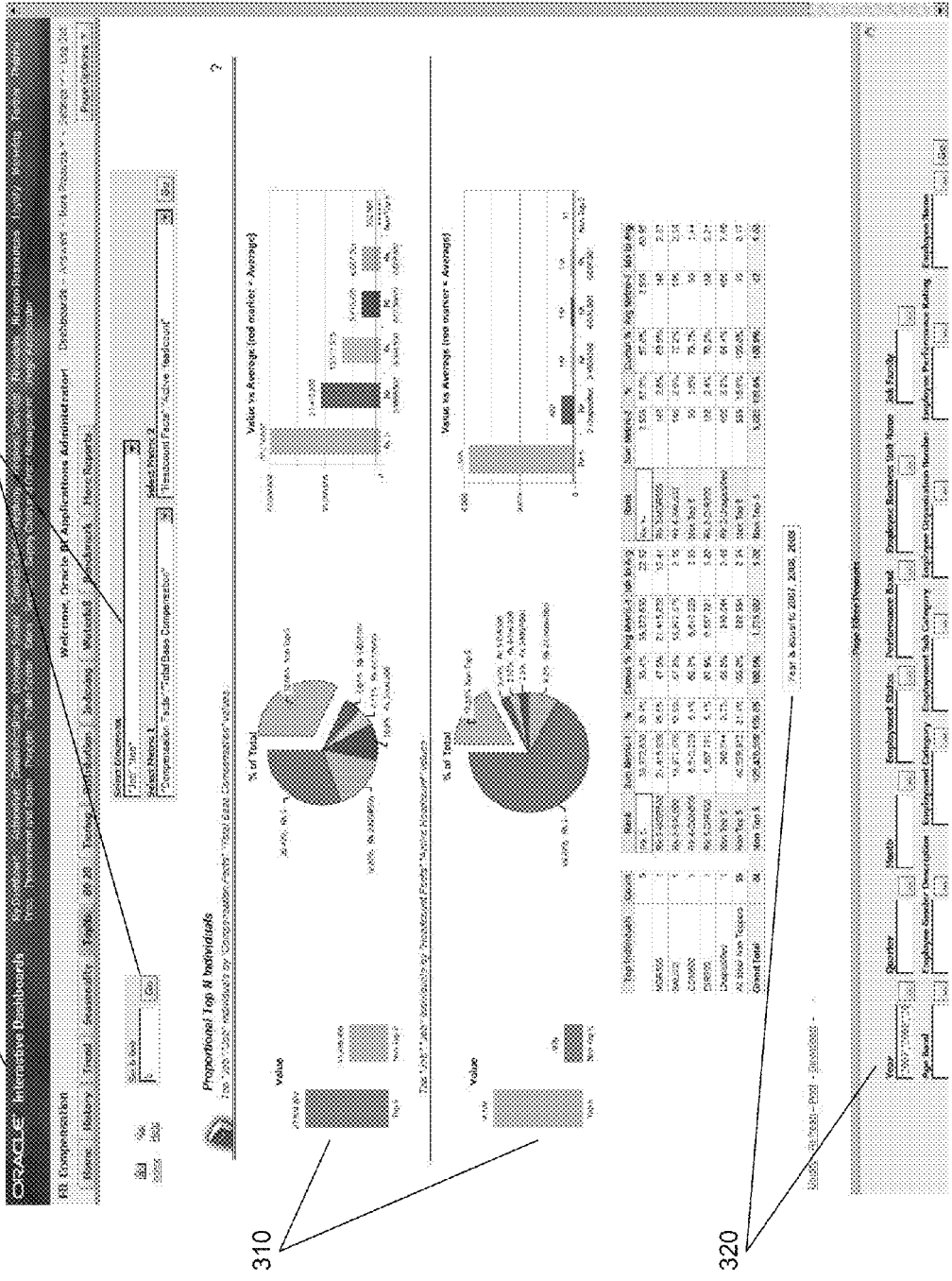
FIG. 3 is a screenshot view of an OBI EE dashboard according to an embodiment of the present invention.
Figure 4A:
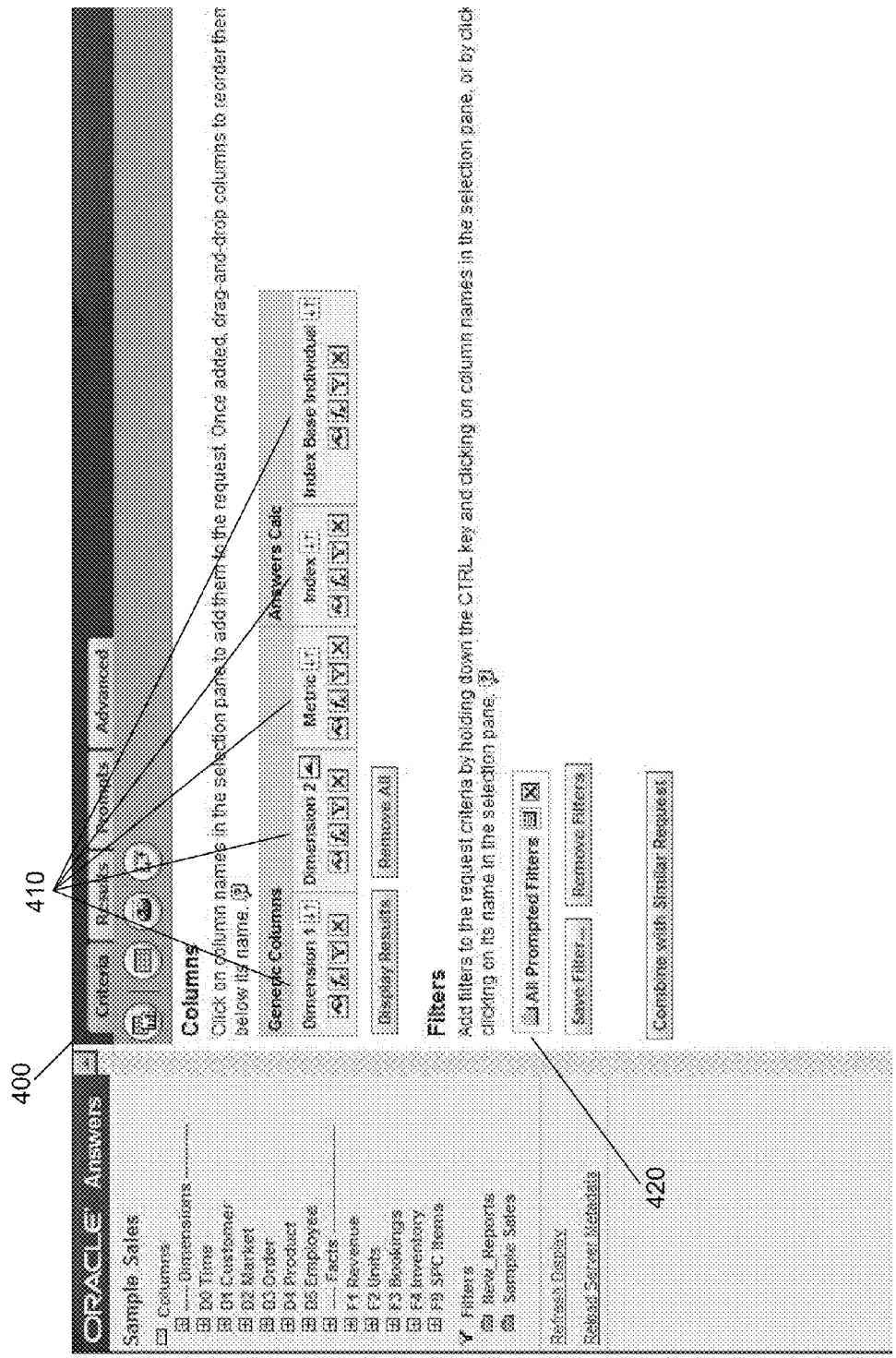
FIG. 4a is an answers design view of an OBI EE report according to an embodiment of the present invention.
Figure 4B:
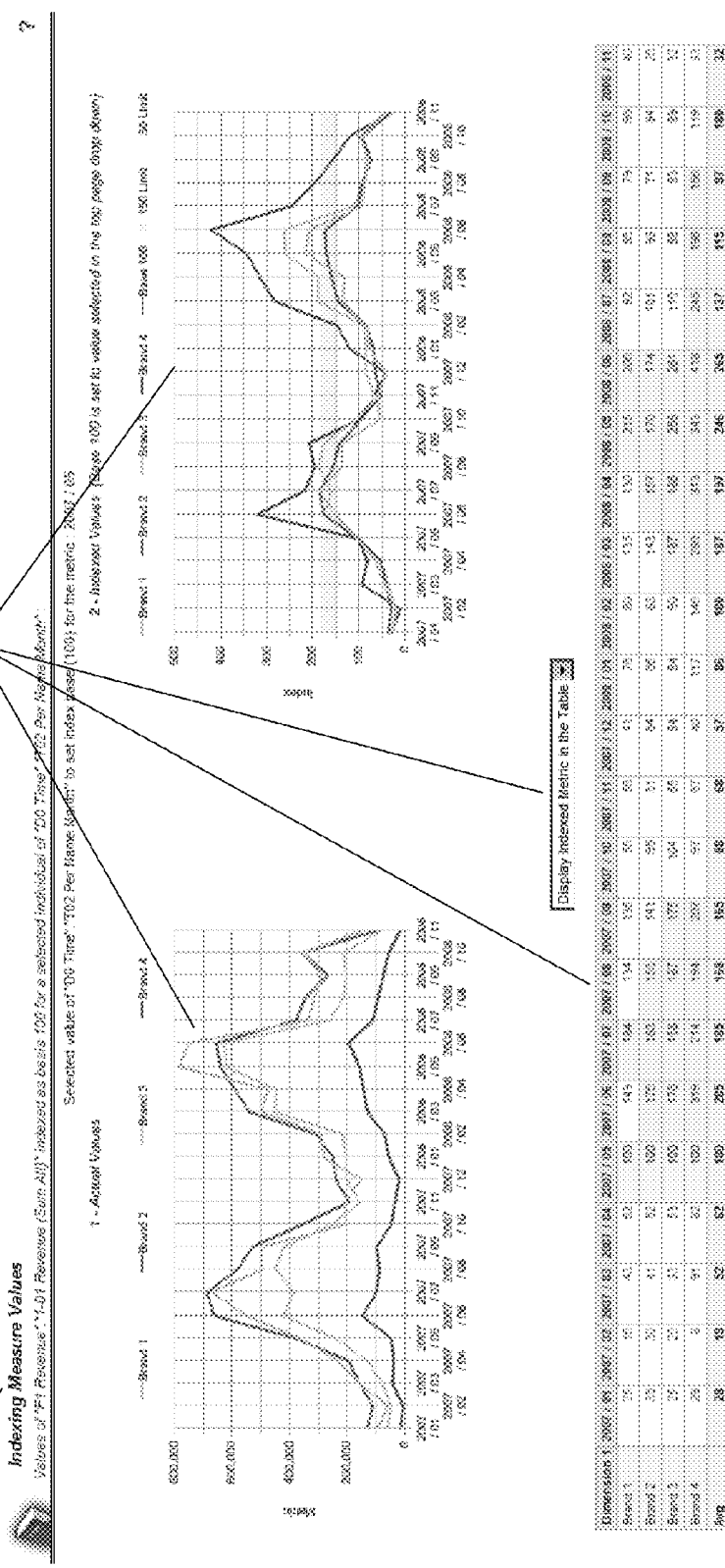
FIG. 4b is a layout design view of an OBI EE report according to an embodiment of the present invention.

FIG. 2 is a high level architectural diagram illustrating the operation of the CAF 210 implemented in conjunction with OBI EE according to an embodiment of the present invention. In some embodiments, a user who is browsing an existing application, such as dashboards 202, answers 204 and RPD 206 that are located in sample library configuration 200, may determine that a type of report or a dashboard would be helpful if applied to another business domain. In OBI EE, dashboards may provide interactive collections of analytic content with a variety of visualizations. Dashboards provide users with information filtered and personalized for the user's identity, function or role based on predefined security rules. FIG. 3 is a screenshot view of an OBI EE dashboard 300 according to an embodiment of the present invention. The illustrated dashboard 300 has various reports 310 that provide business intelligence information to the user. Reports may be used, for example, by dashboards to provide information to a user and a single dashboard may display multiple reports. Dashboard design can also include elements such as prompted filters 320, presentation variables prompters 330 and numerous other design elements at the designer's discretion. FIG. 4a is an answers design view of an OBI EE report according to an embodiment of the present invention. Answers in OBI EE provides users with ad hoc query and analysis capability. New analyses can be created from scratch or existing analyses in dashboard pages may be modified. Answers report definition 400 provides the user with elements making up the report design, such as columns 410, filters 420 and other possible objects (e.g., presentation variables, answers calculations, aggregations, etc). FIG. 4b is a layout design view of an OBI EE report according to an embodiment of the present invention. Report layout screen 430 allows a user to expose several views of the retrieved data 440 (charts, tables, tickers, etc) to compose the final report layout.

A user selects one or more dashboards 202, answers 204 and/or RPD 206 from samples library configuration 200. The selected dashboards, answers and/or RPD are cloned by CAF 210 via CAF cloner 212, and RPD and reports may be synchronized via CAF synchronizer 214. CAF 210 propagates the required OBI EE setup for the selected dashboards/answers/RPD to work in the target environment 220 as dashboards 222, answers 224 and/or RPD 226.

FIG. 5 is a flow diagram illustrating a process flow for cloning content according to an embodiment of the present invention. In some embodiments, the functionality of FIG. 5, and FIG. 6 below, is implemented by software stored in memory or other computer readable media, and executed by a processor. In other embodiments, the functionality may be performed by hardware (e.g., through the use of an ASIC, a programmable gate array ("PGA"), a field programmable gate array ("FPGA"), etc.), or any combination of hardware and software.

In some embodiments, the process of FIG. 5 may be performed, for example, by server 100 of FIG. 1 via content accelerator 145. In FIG. 5, the process flow begins with a CAF cloner of content accelerator 145 being started at 500. The CAF cloner provides the user with control over which source and target environments to use, what source report or dashboard to clone, the location of the target report or dashboard and the naming of the target report or dashboard, awaiting user selection of these features at 505. The CAF cloner checks whether a user selection for these parameters has been made at 510. This could be performed iteratively or else be associated with, and triggered by, an event.

If the CAF cloner receives user selections for the source and target environments at 510, the CAF cloner proceeds to identify the minimum list of required source objects (including root arguments of logical formulas) used in the selected source report or dashboard at 515. The CAF cloner then provides the user with a declarative mapping screen showing the list of required source objects from the source report or dashboard, as well as a list of available objects in the target environment to map the source objects against at 520. If a user manually enters alterations to object formulas at 525, the CAF cloner alters the object formulas in accordance with the user's input at 530. The CAF cloner then awaits mapping information selections from the user at 535.

If mapping information selections are not received from the user at 540, the CAF cloner again checks whether manual alterations to object formulas have been made at 525 and proceeds as discussed above. If mapping information selections were received at 540, if a user wishes to bypass non-critical source objects, the designated non-critical source objects are bypassed at 545 and the user is warned of any potential mismatches in data types when mapping at 550, which could lead to the creation of non-working reports. If further logical calculations are not present in the target environment that are necessary for the report or dashboard that is being cloned, the CAF cloner creates the needed logical calculations at 555. The CAF cloner then replicates the selected report or dashboard in the target environment at 560.

Once the cloning has been performed at 560, the CAF cloner saves mappings designated by the user for reuse at 565 and cloning tasks are logged at 570. While the logging of cloning tasks is shown as occurring after the replication of the selected report or dashboard has been performed, in some embodiments, logging of cloning tasks occurs during the cloning process. The cloned report or dashboard and associated objects are marked with a description that includes a cloning time stamp at 575. The process then ends at 580.

Figure 6:
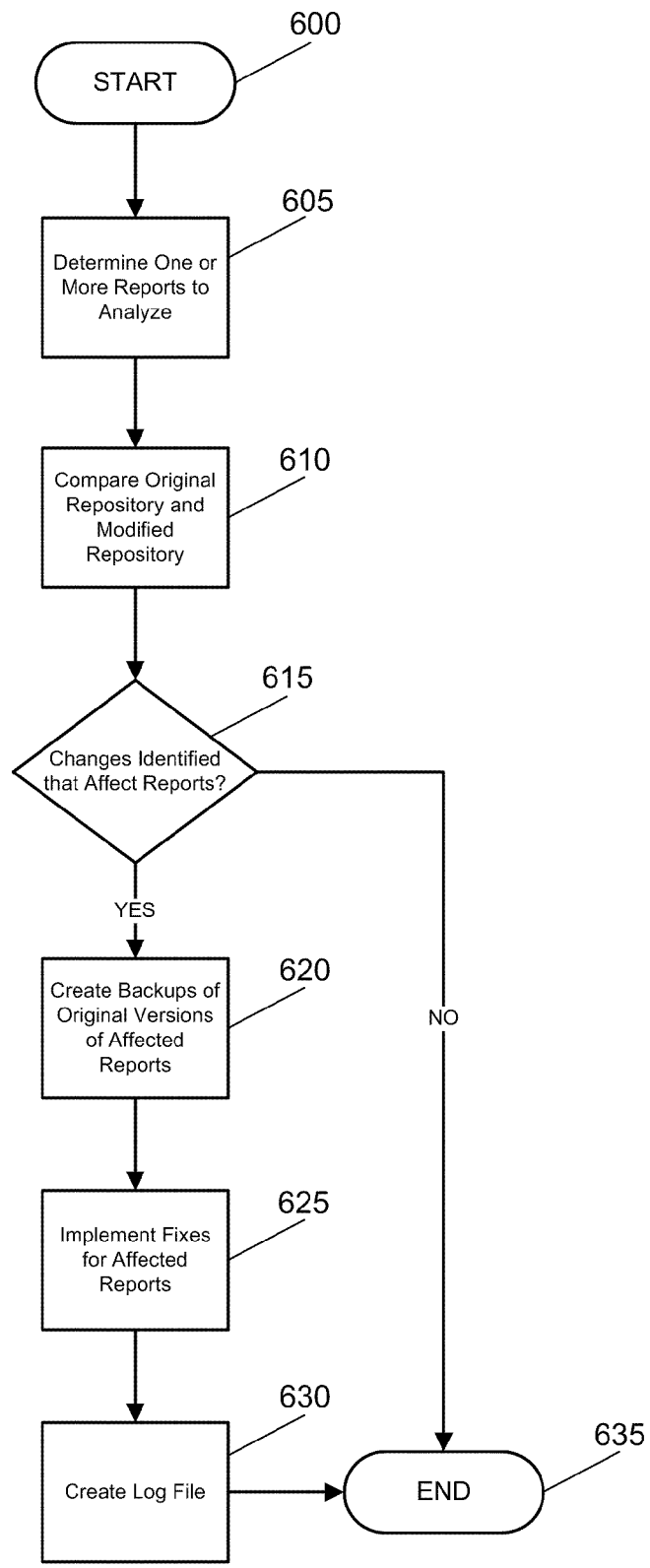
FIG. 6 is a flow diagram illustrating a process flow for synchronizing content according to an embodiment of the present invention.

FIG. 6 is a flow diagram illustrating a process flow for synchronizing content according to an embodiment of the present invention. In some embodiments, the process of FIG. 6 may be performed, for example, by server 100 of FIG. 1 via content accelerator 145. In FIG. 6, the process flow begins with a CAF synchonizer of content accelerator 145 being started at 600. The CAF synchronizer then determines one or more reports to analyze for potential fixes at 605. The determination may be made based on a manual selection by a user of one or more reports or a folder, for instance, or may be performed automatically based on events such as a user modifying a repository. The CAF synchronizer then compares the original repository with a modified repository to see what differences exist between the original and modified versions at 610. Changes that may impact reports include name changes, folder changes, presentation layer moving and deletions, for example. If no repository changes are identified by the CAF synchronizer that affect the reports at 615, the process ends at 635.

However, if changes affecting the reports are identified at 615, the CAF synchronizer creates backups of the original versions of the reports that are affected by the changes at 620. The CAF synchronizer then implements fixes for the affected reports at 625 and creates a log file indicating the changes that were made and the one or more reports that were affected at 630. The process then ends at 635.

Figure 7:
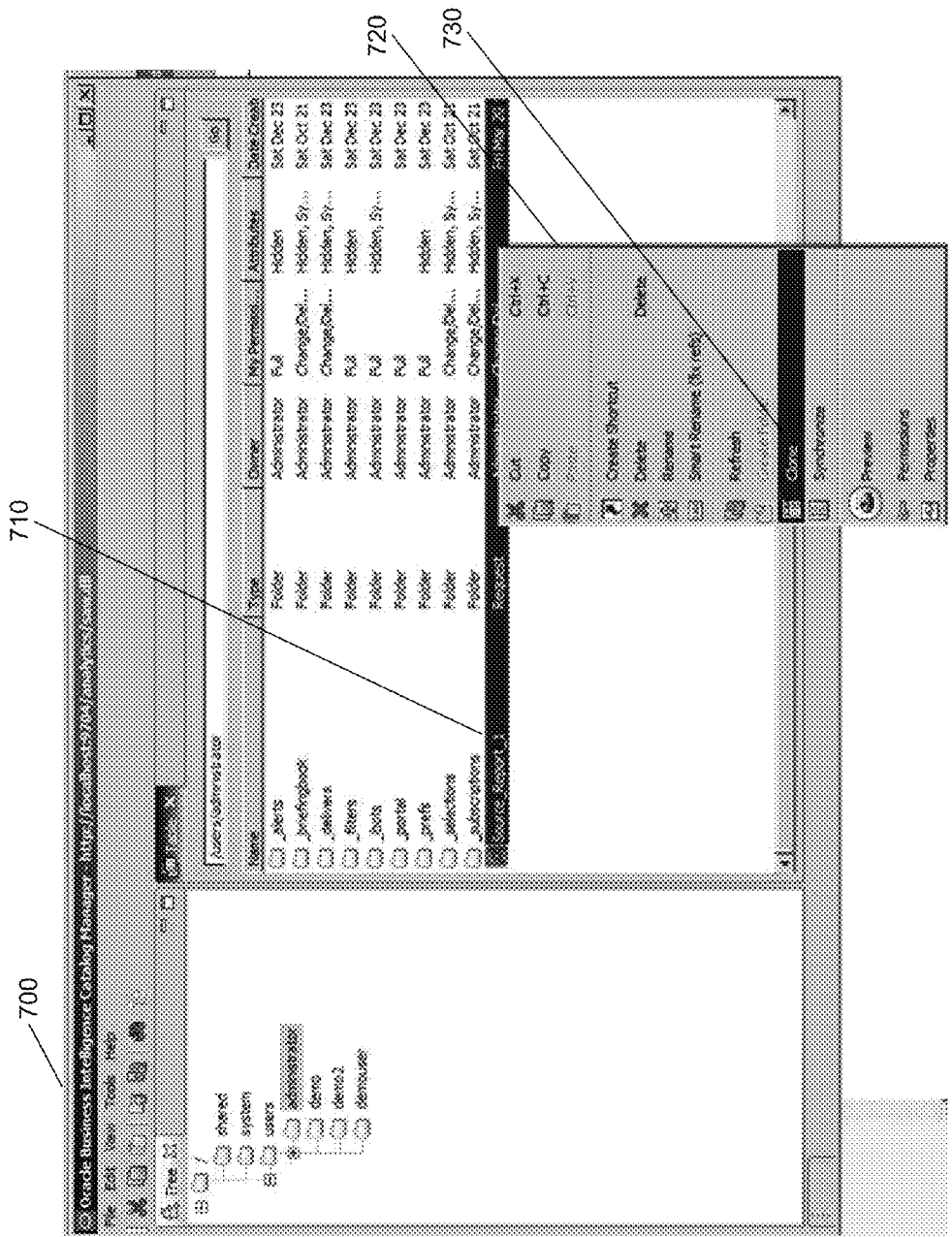
FIG. 7 is a screenshot view of an OBI EE Catalog Manager with CAF cloner functionality according to an embodiment of the present invention.
Figure 8:
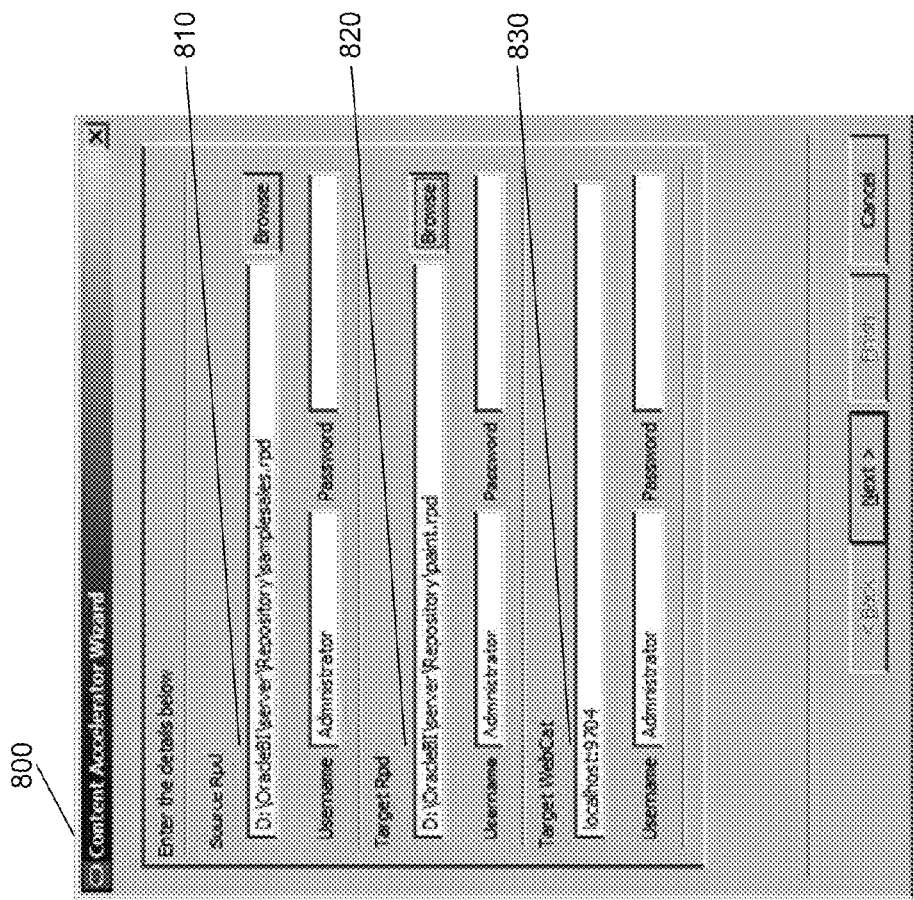
FIG. 8 is a screenshot view of a cloning wizard of a CAF cloner according to an embodiment of the present invention.
Figure 9:
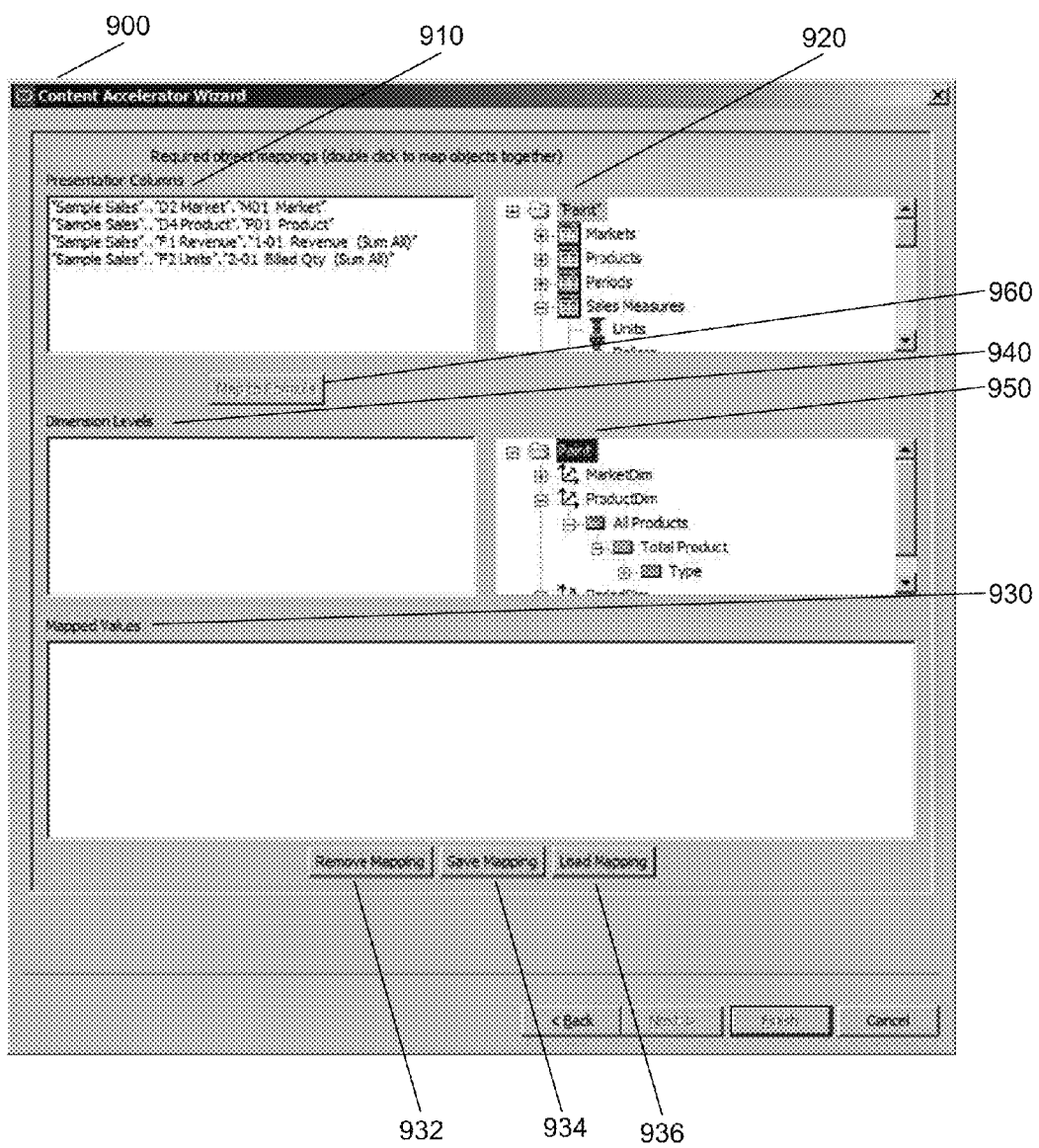
FIG. 9 is a screenshot view of an OBI EE mapping screen of a CAF cloner according to an embodiment of the present invention.

Next, an implementation of the CAF cloner in OBI EE according to an embodiment of the present invention is discussed with respect to FIGS. 7-9. FIG. 7 is a screenshot view of an OBI EE Catalog Manager 700 with CAF cloner functionality according to an embodiment of the present invention. In this embodiment, a user has selected Source_Report_1 710 to clone by selecting Source_Report_1 710, right-clicking to bring up popup menu 720 and selecting "Clone" option 730. In some embodiments, multiple reports can also be selected for cloning by selecting multiple reports in OBI EE Catalog Manager 700 (using, for instance, ALT-click), right-clicking one of the selected reports and choosing "Clone" option 730. Some embodiments of the CAF cloner also work with dashboard pages as sources. The full layout of the selected dashboard page is cloned and the reports within those pages are exposed.

Once the user has selected one or more reports to run the CAF cloner on, in some embodiments, the user is then prompted to select a source and a target repository, such as an RPD repository of OBI EE. FIG. 8 is a screenshot view of a cloning wizard 800 of a CAF cloner according to an embodiment of the present invention. Cloning wizard 800 allows a user to designate a location of a source RPD 810, a location of a target RPD 820 and a location of a target web catalog 830. Source RPD location 810 is the path to an RPD file that supports the source report/dashboard selected for cloning. Some embodiments of the CAF cloner may use this information to list the objects used in selected source/report dashboards and to identify the minimum set of mappings needed with objects in the target environment. Some of the logical calculations in the source RPD that are used in reports may get cloned into the target RPD. In some embodiments, only the offline version of the source RPD is accepted by the CAF cloner and the source RPD will not be modified during the cloning process.

Target RPD location 820 is the path to an RPD file of the target environment where selected source objects (reports and dashboards) will be cloned. In some embodiments, the CAF cloner requires access to the target RPD in order to offer users with possible mappings for objects required in the selected source objects (reports and dashboards). In some embodiments, an offline version of the target RPD is required. The CAF cloner may modify the code of the target RPD during the cloning process. In some cases, logical calculations are needed in the source reports. A warning message may be displayed before updating the target RPD and a backup of the original target RPD file may be saved.

Target web catalog location 830 is the path to the target web catalog where generated code for clones of reports and dashboards will be saved. In some embodiments, the CAF cloner requires an online web catalog in order to clone the reports. In some embodiments, the CAF cloner uses the online web catalog to create folders, reports and dashboards with the right objects. Once created, these reports can be manually copied and/or moved to another instance.

FIG. 9 is a screenshot view of an OBI EE mapping screen 900 of a CAF cloner according to an embodiment of the present invention. After performing initial parsing, the CAF cloner identifies a minimum set of columns that is required for recreating the report to be cloned. Now, mapping screen 900 prompts the user to provide a proper mapping of each required column to the selected subject area in the target environment. The CAF cloner allows users to provide a source to target mapping for each column that is required to recreate the selected source content. The required columns are displayed in required column pane 910. In some embodiments, to proceed to the next step, all columns in mapping screen 900 need to be mapped to target columns. In this case, only four columns require mapping information in required column pane 910. Logical formulas associated with the mapped columns will be reproduced in the target RPD and used in the target report.

In some embodiments, a user may map a source column to a target column by clicking on the source column and the double-clicking the target column in column mapping pane 920. Once a column is mapped, the column is removed from required column pane 910 and displayed in mapped values pane 930. Mappings may also be removed or saved from mapped values pane 930 using the remove mapping button 932 or the save mapping button 934, respectively. Previously saved mappings may be loaded using the load mapping button 936.

In the event that level based metrics or specific logical calculations having hierarchies are used, the CAF cloner may require the user to provide information pertaining to the target hierarchies that should be used and the levels in the target hierarchy that substitute for levels in the source hierarchy. Level based metrics are metrics that are explicitly set to aggregate at a specific level of a dimension in the RPD. If a column expression in a source report is detected that has a dimension level, the column shows up in required dimension level pane 940 and dimensions to map are displayed in dimension mapping pane 950.

Map to formula button 960 allows a user to manually enter a new logical formula beyond providing a one-to-one mapping between columns. For instance a source column could be mapped to a new object in the target RPD. The formula created by the user would be replicated in the logical layer of the target RPD as an additional RPD object and would be used by the CAF cloner as a substitute to the source column.

Figure 10:
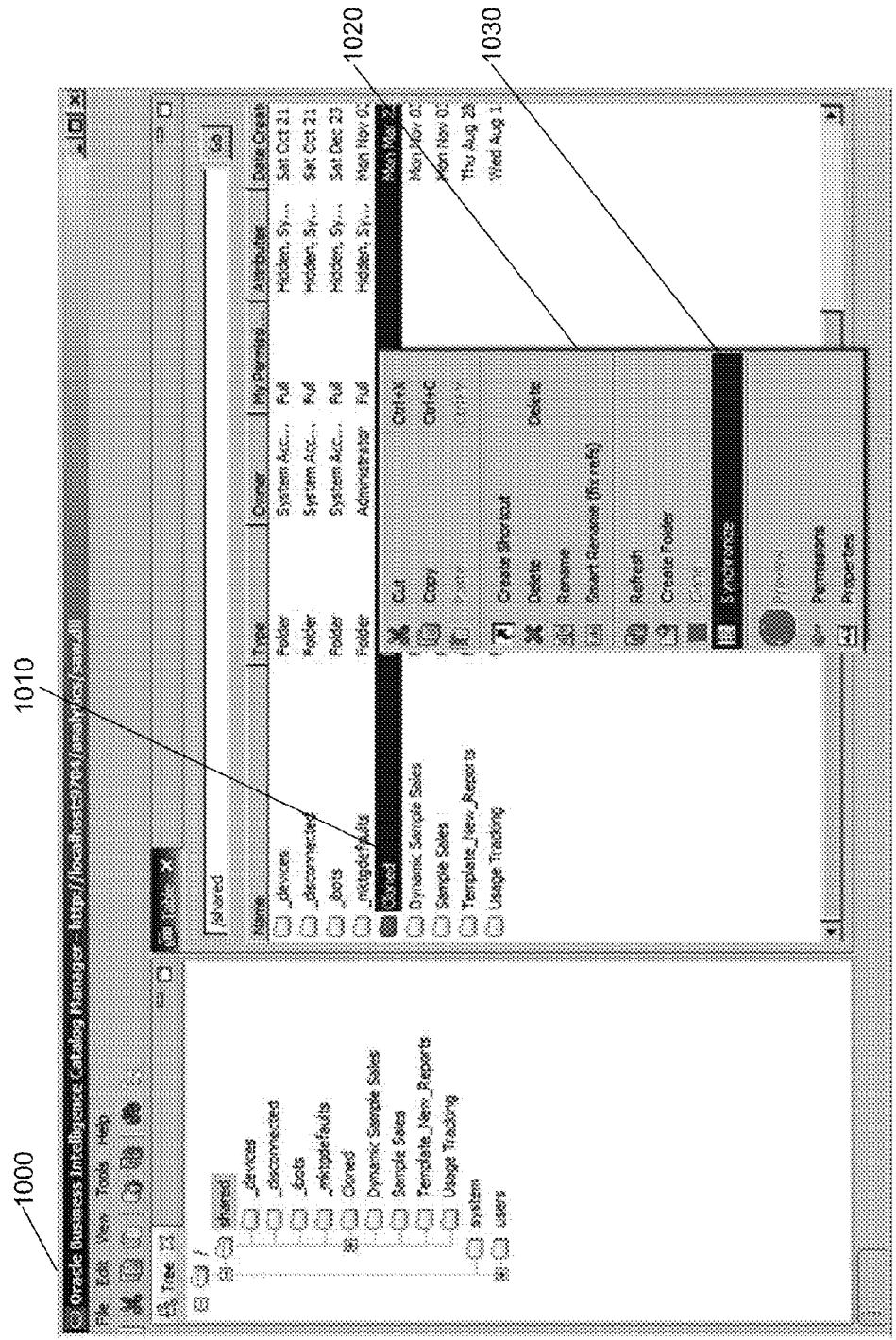
FIG. 10 is a screenshot view of an OBI EE Catalog Manager with CAF synchronizer functionality according to an embodiment of the present invention.
Figure 11:
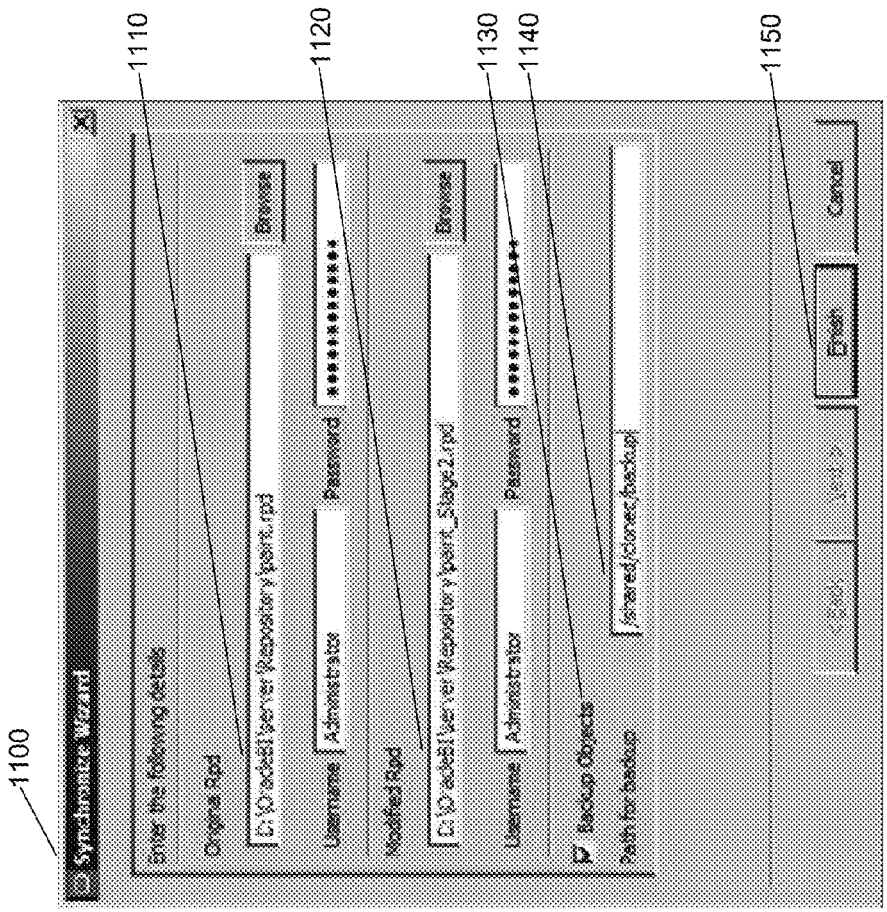
FIG. 11 is a screenshot view of a synchronizer wizard of a CAF synchronizer according to an embodiment of the present invention.

An implementation of the CAF synchronizer in OBI EE according to an embodiment of the present invention is discussed with respect to FIGS. 10 and 11. Cloning processes that create new logical objects in target repositories may result in poor functional naming of new columns (e.g., "Auto Gen 1", "Auto Gen 2", etc.). Proper functional renaming of the columns should be performed to complete some embodiments of the CAF process in order to make reports intuitive to functional users. However, rearranging and renaming objects in the target repository may impact the presentation layer and may thereby break functionality that uses the columns. Some embodiments of the CAF synchronizer address this issue by automatically fixing reports with updated repository object names. Such a synchronizer may be useful both as part of the cloning process and when deploying repository objects and folder name changes in a web catalog.

FIG. 10 is a screenshot view of an OBI EE Catalog Manager 1000 with CAF synchronizer functionality according to an embodiment of the present invention. In this embodiment, a user has selected the Cloned folder 1010, right-clicking to bring up the popup menu 1020 and selecting the "Synchronize" option 1030. In some embodiments, multiple reports or folders can also be selected for synchronization by selecting multiple reports or folders in OBI EE Catalog Manager 1000 (using, for instance, ALT-click), right-clicking one of the selected reports or folders and choosing the "Synchronize" option 1030.

Once the user has selected one or more reports or folders to run the CAF synchronizer on, in some embodiments, the CAF synchronizer is launched. FIG. 11 is a screenshot view of a synchronizer wizard 1100 of a CAF synchronizer according to an embodiment of the present invention. Synchronizer wizard 1100 has paths to both an original RPD location 1110 and a modified RPD location 1120. If backup objects option 1130 is selected, a backup copy of the web catalog requests will be preserved in the path specified at 1140 and synchronizer wizard 1100 updates the objects.

Upon clicking finish button 1150, in some embodiments, the CAF synchronizer parses through the original and modified RPDs and detects modifications that happened between the files. Then, the CAF synchronizer identifies whether the requests use any of the modified objects and need to be synchronized. The CAF synchronizer then updates each of the requests with the proper new name of the column in the target RPD.

In some embodiments, a CAF contains a cloner and a synchronizer. The cloner includes a source identification module configured to identify source objects in a source environment from one or more business intelligence reports. The cloner also includes a mapping module configured to provide a declarative mapping screen showing the source objects and a list of available objects in a target environment to map the source objects against, and to receive mapping information selections from a user. The cloner further includes a duplication module configured to duplicate the one or more business intelligence reports into the target environment based on the mapping information selections.

The synchronizer includes a report determining module configured to determine one or more business intelligence reports existing in a target web catalog to analyze for repository changes. The synchronizer also includes a repository comparison module configured to compare an original repository and a modified repository and a change identification module configured to identify one or more repository changes impacting at least one of the one or more reports. The synchronizer further includes a repair module configured to implement fixes for the at least one impacted business intelligence report in the target web catalog.

As disclosed, some embodiments of the content accelerator framework ("CAF") include a CAF cloner and a CAF synchronizer. The CAF cloner enables a user to duplicate reports from one business intelligence environment in another business intelligence environment, and the duplication process may enable a user to realize significant gains in efficiency and accuracy over a manual duplication of a report. The CAF synchronizer enables reports to be updated with various changes. The CAF synchronizer may be used in conjunction with, or separately from, the CAF cloner.

While the term "server" has been used in the description of some embodiments of the present invention, the invention may be applied to many types of network computing devices. For purposes of this invention, the term "server" includes rack computing systems, cloud computing systems, distributed computing systems, personal computers, laptops, cell phones, personal digital assistants, tablet computing devices, mainframes, any networked devices that perform computing operations, and any of these physical servers. A server may also be an application server, such as Oracle WebLogic Server®, and may be run as software on a single physical server or distributed across multiple physical servers.

One having ordinary skill in the art will readily understand that the invention as discussed above may be practiced in a different order, and/or with hardware elements in configurations that are different than those that are disclosed. Therefore, although the invention has been described based upon these preferred embodiments, it would be apparent to, and readily appreciated by, those of ordinary skill in the art that certain modifications, variations, and alternative constructions would be apparent, while remaining within the spirit and scope of the invention. In order to determine the metes and bounds of the invention, therefore, reference should be made to the appended claims.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

What is claimed is:

1. A non-transitory computer-readable medium having instructions stored thereon that, when executed by a processor, cause the processor to generate a business intelligence dashboard, the generating comprising:

receive from a source environment a first interactive dashboard, wherein the first interactive dashboard comprises a first layout and first logical calculations that generate first data to be displayed in the first layout, wherein the source environment is a first business intelligence system repository;

identify a list of required source objects used in the first interactive dashboard that are required in a target environment, wherein the required source objects comprise one or more of the first logical calculations for displaying data on the first interactive dashboard;

provide a declarative mapping screen showing the list of required source objects including root arguments of logical formulas, and a list of available objects in the target environment to map the source objects against, wherein the target environment is a second business intelligence system repository that is different than the first business intelligence system repository, wherein the declarative mapping screen identifies one or more database columns that are required for duplicating the first interactive dashboard on the target environment, wherein associated logical formulas that are associated with the identified required database columns are reproduced in the target environment;

receive mapping information selections from a user, wherein each of the list of required source objects is mapped to an available object of the list of available objects in the target environment;

receive alterations to the logical formulas; and generate the second interactive dashboard for use in the target environment based on the mapping information selections and the first interactive dashboard, wherein the second interactive dashboard comprises a second layout that is a duplicate of the first layout, and second logical calculations that are different than the first logical calculations and that are created based on the alterations to the logical formulas and that generate second data to be displayed in the second layout.

2. The computer-readable medium of claim 1, further comprising determining whether each of the list of required source objects has been mapped to an available object.

3. The computer-readable medium of claim 1, wherein the generating saves designated mappings for reuse.

4. The computer-readable medium of claim 1, wherein the generating:
bypasses non-critical source objects by ignoring the mapping of the non-critical source objects; and
warns the user of potential mismatches in data types in the mapping.

5. The computer-readable medium of claim 1, wherein the generating provides the user with control over which source and target environments to use, location of the second interactive dashboard in the target environment, and naming of the second interactive dashboard in the target environment.

6. The computer-readable medium of claim 1, wherein the generating creates logical calculations needed for the second interactive dashboard that are not present in the target environment.

7. The computer-readable medium of claim 1, wherein the generating:
provides a log of all tasks performed during duplication; and
marks the second interactive dashboard and associated objects that were created with a description that comprises a duplication time stamp.

8. The computer-readable medium of claim 1, wherein the source objects comprise required and optional objects.

9. The computer-readable medium of claim 1, wherein the generating duplicates logical calculation objects associated with the first interactive dashboard into the target environment based on the mapping information selections.

10. The computer-readable medium of claim 1, wherein the first logical calculations comprise a logical metric definition in the first business intelligence system repository, and logical ancestor objects that are used as arguments.

11. The computer-readable medium of claim 1, further comprising automatically updating repository object names for the second interactive dashboard.

12. A cloner configured to assist users in deploying templates from a source environment into a target environment, comprising:

a source identification module configured to identify source objects in a source environment from a received first interactive dashboard, wherein the source environment is a first business intelligence system repository, wherein the first interactive dashboard comprises a first layout, and first logical calculations that generate first data to be displayed in the first layout;

an identification module that identifies a list of required source objects used in the first interactive dashboard that are required in the target environment, wherein the required source objects comprise one or more of the first logical calculations for displaying data on the first interactive dashboard;

a mapping module configured to provide a declarative mapping screen showing the source objects including root arguments of logical formulas, and a list of available objects in the target environment to map the source objects against, and to receive mapping information selections from a user and receive alterations to the logical formulas, wherein the target environment is a second business intelligence system repository that is different than the first business intelligence system repository and each of the list of required source objects is mapped to an available object of the list of available objects in the target environment, wherein the declarative mapping screen identifies one or more database columns that are required for duplicating the first interactive dashboard on the target environment, wherein associated logical formulas that are associated with the identified required database columns are reproduced in the target environment; and a duplication module stored in memory and executed by a processor and configured to generate the second interactive dashboard for use in the target environment based on the mapping information selections and the first interactive dashboard, wherein the second interactive dashboard comprises a second layout that is a duplicate of the first layout, and second logical calculations that are different than the first logical calculations and that are created based on the alterations to the logical formulas and that generate second data to be displayed in the second layout.

13. The cloner of claim 12, wherein the first interactive dashboard comprises a first report that is duplicated as a second report for use with the second interactive dashboard.

14. The cloner of claim 12, wherein the mapping module is further configured to bypass non-critical source objects by ignoring the mapping of the non-critical source objects and to warn the user of potential mismatches in data types in the mapping.

15. The cloner of claim 12, wherein the source objects comprise required and optional objects.

16. The cloner of claim 12, wherein the duplication module is further configured to duplicate logical calculation objects associated with the first interactive dashboard into the target environment based on the mapping information selections.

17. A non-transitory computer-readable medium having instructions stored thereon that, when executed by a processor, cause the processor to generate a business intelligence dashboard, the generating comprising:

determine from a source environment a first interactive dashboard existing in a target web catalog to analyze for repository changes, wherein the first interactive dashboard comprises a first layout, and first logical calculations that generate first data to be displayed in the first layout, wherein the source environment is a first business intelligence system;

compare an original repository of the first business intelligence system and a modified repository of the second business intelligence system;

identify a list of required source objects used in the first interactive dashboard that are required in a target environment, wherein the required source objects comprise one or more of the first logical calculations for displaying data on the first interactive dashboard;

provide a declarative mapping screen showing the list of required source objects including root arguments of logical formulas, and a list of available objects in the target environment to map the source objects against, wherein the target environment is the second business intelligence system repository that is different than the first business intelligence system repository, wherein the declarative mapping screen identifies one or more database columns that are required for duplicating the first interactive dashboard on the target environment, wherein associated logical formulas that are associated with the identified required database columns are reproduced in the target environment;

receive alterations to the logical formulas; and implement fixes for the first interactive dashboard in the target web catalog, wherein the fixes allow the first interactive dashboard to be duplicated as the second interactive dashboard for the second business intelligence system, wherein the second interactive dashboard comprises a second layout that is a duplicate of the first layout, and second logical calculations that are different than the first logical calculations and that are created based on the alterations to the logical formulas and that generate second data to be displayed in the second layout;

wherein the fixes comprise receiving mapping information selections, wherein each of the list of required source objects is mapped to an available object of the list of available objects in the target environment.

18. The computer-readable medium of claim 17, wherein the one or more identified repository changes comprise a name change, presentation layer moving or deletions.

19. The computer-readable medium of claim 17, to the generating further comprising:

create a backup of an original version of the first interactive dashboard that is affected by the one or more repository changes; and create a log file indicating the changes that were made and the first interactive dashboard that was affected.

20. A system, comprising:

a cloner, comprising:

a source identification module configured to identify source objects in a source environment from a received first interactive dashboard, wherein the source environment is a first business intelligence system repository, wherein the first interactive dashboard comprises a first layout, and first logical calculations that generate first data to be displayed in the first layout, wherein the source environment is a first business intelligence system repository, an identification module that identifies a list of required source objects used in the first interactive dashboard that are required in a target environment, wherein the required source objects comprise one or more of the first logical calculations for displaying data on the first interactive dashboard;

a mapping module configured to provide a declarative mapping screen showing the list of required source objects including root arguments of logical formulas, and a list of available objects in the target environment to map the source objects against, and to receive mapping information selections from a user and receive alterations to the logical formulas, wherein the target environment is a second business intelligence system repository that is different than the first business intelligence system repository, and each of the source objects of the list of required source objects is mapped to an available object of the list of available objects in the target environment, wherein the declarative mapping screen identifies one or more database columns that are required for duplicating the first interactive dashboard on the target environment, wherein associated logical formulas that are associated with the identified required database columns are reproduced in the target environment; and a duplication module stored in memory and executed by a processor and configured to generate the second interactive dashboard for use in the target environment based on the mapping information selections and the first interactive dashboard, wherein the second interactive dashboard comprises a second layout that is a duplicate of the first layout, and second logical calculations that are different than the first logical calculations and that are created based on the alterations to the logical formulas and that generate second data to be displayed in the second layout; and a synchronizer, comprising:

a report determining module configured to determine one or more business intelligence reports existing in a target web catalog to analyze for repository changes, a repository comparison module configured to compare an original repository and a modified repository, a change identification module configured to identify one or more repository changes impacting at least one of the one or more business intelligence reports, and a repair module configured to implement fixes for the one or more at least one impacted business intelligence report in the target web catalog.

21. The system of claim 20, wherein the first interactive dashboard comprises a first report that is duplicated as a second report for use with the second interactive dashboard.

22. The system of claim 20, wherein the one or more identified repository changes comprise a name change, a folder change, presentation layer moving or deletions.

23. The system of claim 20, wherein the source objects comprise required and optional objects.

24. The system of claim 20, wherein the duplication module is further configured to duplicate logical calculation objects associated with the first interactive dashboard into the target environment based on the mapping information selections.

* * * * *